(12) United States Patent
Urabe et al.

(10) Patent No.: US 11,062,642 B2
(45) Date of Patent: Jul. 13, 2021

(54) DISPLAY APPARATUS FOR COMPARING AND DISPLAYING IMAGE SIGNALS IN A PLURALITY OF IMAGE QUALITIES AND CONTROL METHOD THEREOF

(71) Applicant: CANON KABUSHIKI KAISHA, Tokyo (JP)

(72) Inventors: Hirofumi Urabe, Tokyo (JP); Masahiro Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/353,025

(22) Filed: Mar. 14, 2019

(65) Prior Publication Data

US 2019/0287450 A1    Sep. 19, 2019

(30) Foreign Application Priority Data

Mar. 15, 2018    (JP) .............................. JP2018-047776

(51) Int. Cl.
  *G09G 3/20* (2006.01)
  *H04N 9/77* (2006.01)
  *H04N 9/64* (2006.01)
(52) U.S. Cl.
  CPC ........... *G09G 3/2088* (2013.01); *H04N 9/646* (2013.01); *H04N 9/77* (2013.01)
(58) Field of Classification Search
  CPC ........ H04N 9/646; H04N 9/77; H04N 1/6011; H04N 1/6013; H04N 21/4854; H04N 5/57;

(Continued)

(56) References Cited

U.S. PATENT DOCUMENTS 10,096,095 B2    10/2018  Sato et al.
10,528,792 B2     1/2020  Kagaya et al.
(Continued)

FOREIGN PATENT DOCUMENTS

JP    2008-224997 A     9/2008
JP    2017-181762 A    10/2017

OTHER PUBLICATIONS

Chinnock, "The Status of Wide Color Gamut UHD-TVs", Technical paper published by Insight Media, Jan. 2016 (Year: 2016).*

(Continued)

*Primary Examiner* — Yuzhen Shen
(74) *Attorney, Agent, or Firm* — Cowan, Liebowitz & Latman, P.C.

(57) ABSTRACT

A display apparatus, comprising: a memory that stores correspondence to convert an image quality of an image signal; and at least one processor that operates as: an input unit that inputs a first image signal having a first image quality; a generation unit; and a display unit that displays the first image signal and the image signal generated by the generation unit, wherein in the case of the memory storing correspondence to generate a second image signal having a second image quality from the first image signal, the generation unit generates the second image signal from the first image signal in accordance with the correspondence, and in the case of the memory not storing the correspondence to generate the second image signal from the first image signal, the generation unit generates a third image signal by performing a predetermined luminance conversion on the first image signal.

14 Claims, 7 Drawing Sheets

(58) Field of Classification Search
CPC ..... G09G 2320/0626; G09G 2320/066; G09G 2320/0673
See application file for complete search history.

(56) References Cited

U.S. PATENT DOCUMENTS

| | | | | |
|---|---|---|---|---|
| 2016/0322020 | A1* | 11/2016 | Park | G09G 3/2003 |
| 2016/0344990 | A1* | 11/2016 | Kozuka | H04N 5/202 |
| 2017/0330312 | A1* | 11/2017 | Nam | H04N 5/202 |
| 2018/0025477 | A1* | 1/2018 | Min | G06T 5/00 |
| | | | | 345/590 |
| 2018/0241979 | A1* | 8/2018 | Kanda | H04N 9/68 |
| 2019/0058855 | A1* | 2/2019 | Uchimura | G11B 27/326 |
| 2019/0172416 | A1* | 6/2019 | Yokota | G09G 5/026 |

OTHER PUBLICATIONS

Display Daily, "UHD: HDR/WCG to become mainstream" published by Display Daily, Jan. 2016, (Year: 2016).*
Samsung, "Samsung Announces HDR+ Firmware Update for 2016 SUHD TVs" published by Samsung, Jul. 2016 (Year: 2016).*
Canon, technical report published by Canon web site, 2020 (Year: 2020).*

* cited by examiner

FIG.3

| | SET VALUE |
| --- | --- |
| DISPLAY TYPE SETTING | HDR/SDR COMPARISON |
| | LUT COMPARISON |
| | IMAGE PROCESSING COMPARISON |
| | OFF |

FIG.4

| HDR SIGNAL | | SDR SIGNAL | |
|---|---|---|---|
| COLOR GAMUT | GAMMA CHARACTERISTIC | COLOR GAMUT | GAMMA CHARACTERISTIC |
| BT.2020 | PQ | BT.709 | GAMMA 2.4 |
| BT.2020 | HLG | NO CORRESPONDENCE | |
| ... | ... | ... | ... |
| COLOR GAMUT A | GAMMA CHARACTERISTIC B | COLOR GAMUT a | GAMMA CHARACTERISTIC b |
| COLOR GAMUT A | GAMMA CHARACTERISTIC C | NO CORRESPONDENCE | |
| NO CORRESPONDENCE | | COLOR GAMUT d | GAMMA CHARACTERISTIC e |

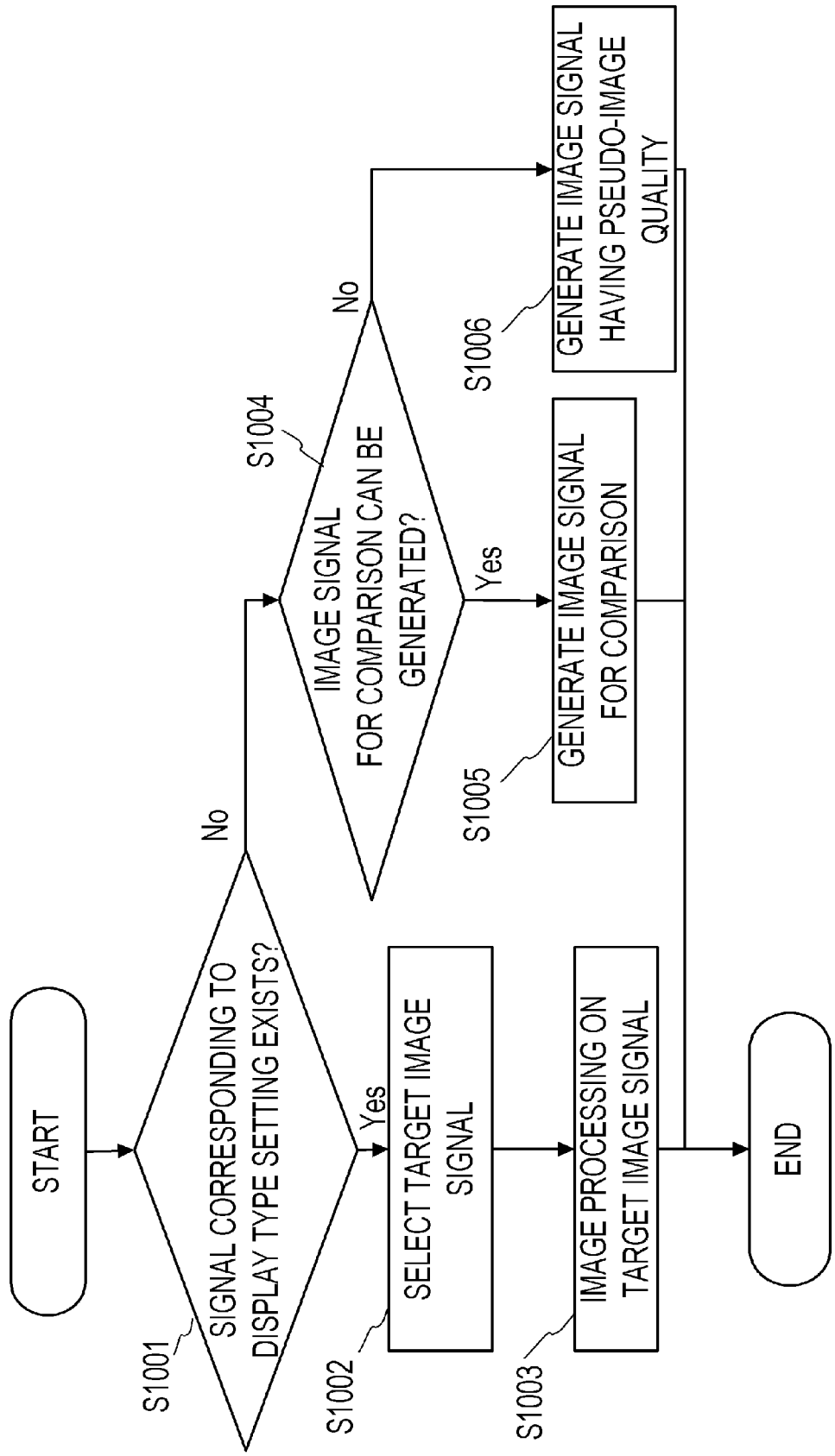

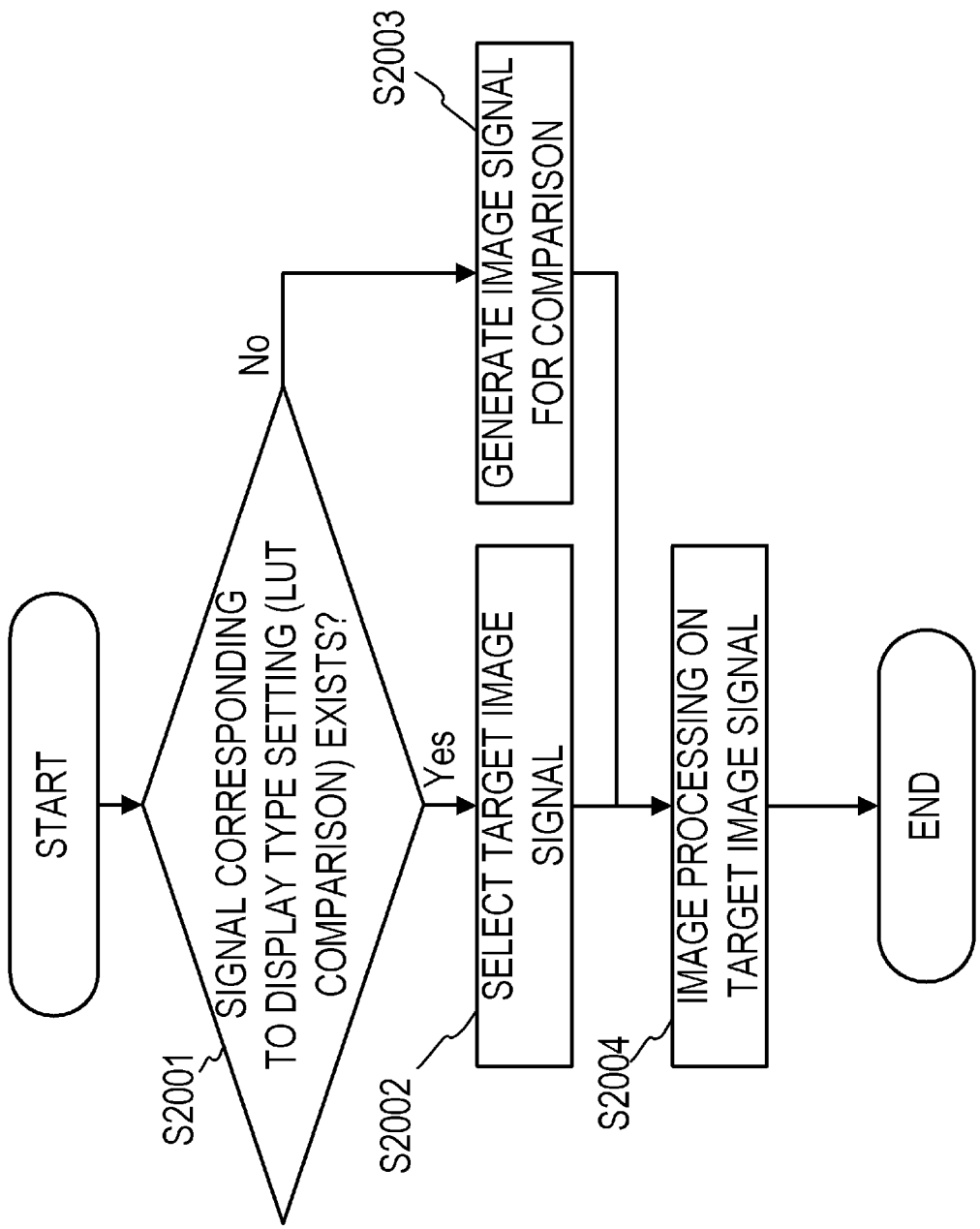

DISPLAY APPARATUS FOR COMPARING AND DISPLAYING IMAGE SIGNALS IN A PLURALITY OF IMAGE QUALITIES AND CONTROL METHOD THEREOF

BACKGROUND OF THE INVENTION

Field of the Invention

The present invention relates to a display apparatus and a control method thereof.

Description of the Related Art

In recent years, new standards on color gamut, such as T. 2020 and new standards on dynamic range, such as perceptual quantizer (PQ) and hybrid long-gamma (HLG), where established in the video production fields, including casting and movies. By using these new standards, images can be displayed in a wider color gamut and wider dynamic range (width and range of luminance (brightness)) compared with conventional standards on color gamut (e.g. BT. 709) and conventional standards on dynamic range (e.g. Gamma 2.2, Gamma 2.4).

The dynamic range based on a conventional standard is called the "standard dynamic range (SDR)", whereas the dynamic range based on a new high dynamic range standard is called the "high dynamic range (HDR)". In other words, the dynamic range of HDR is wider than that of SDR. Further, the upper limit luminance in HDR is normally higher than the upper limit luminance of SDR. When HDR video contents are produced, the video images are produced while comparing and confirming the differences in the views between SDR and HDR.

In some cases, an image quality correction function, such as the color decision list (CDL), may be used for video images. In the case of producing more colorful images by correcting video images like this, the video contents are produced while comparing and confirming the video image before and after performing the correction processing. In a display apparatus, such as a liquid crystal monitor, that is used in such a video producing site, an apparatus, which divides the screen into regions (e.g. left and right regions) and displays different input signals in each region may be used so as to perform different image quality settings. For example, Japanese Patent Application Publication No. 2017-181762 discloses a technique to compare HDR and SDR by controlling the luminance in the left and right regions respectively.

SUMMARY OF THE INVENTION

In the case of the technique disclosed in Japanese Patent Application Publication No. 2017-181762, however, if a display to compare HDR and SDR (hereafter called HDR/SDR comparison display) is desired, the user must select the quality of the video image to be displayed and set the image quality thereof for each region divided in the display apparatus. These settings take time. For example, in the case where the screen of the display apparatus is divided into a left screen and right screen, and the HDR display based on the BT. 2020 and PQ standards is performed on the left screen, the color gamut and gamma and luminance of HDR must be set for the HDR image displayed on the left screen. In the case where the SDR display based on the BT.709 and Gamma 2.2 standards, is performed on the right screen as well, the image quality setting and the like must be performed for the right screen.

In concrete terms, in the case of the invention according to Japanese Patent Application Publication No. 2017-181762, if the HDR/SDR comparison display is set, the luminance on the SDR side is adjusted by the display apparatus, but the user must manually input the other setting contents and set the image quality. Further, in the case of confirming the image quality settings before and after the correction using CDL, it is necessary to set such that the CDL correction is not performed for one image signal, while the CDL correction is performed for the other image signal.

With the foregoing in view, it is an object of the present invention to provide a display apparatus which can easily perform a comparison display of a plurality of image qualities.

A first aspect of the present invention is a display apparatus, comprising:

a memory that stores correspondence to convert an image quality of an image signal; and at least one processor that operates as:

an input unit configured to input a first image signal having a first image quality;

an instruction unit configured to receive a comparison instruction to display the first image signal in the first image quality and in a second image quality;

a generation unit configured to generate an image signal; and a display unit configured to display the first image signal and the image signal generated by the generation unit, wherein in the case of the memory storing correspondence to generate a second image signal having the second image quality from the first image signal, the generation unit generates the second image signal from the first image signal in accordance with the correspondence, and in the case of the memory not storing the correspondence to generate the second image signal from the first image signal, the generation unit generates a third image signal by performing a predetermined luminance conversion on the first image signal.

A second aspect of the present invention is a display apparatus, comprising:

at least one processor that operates as:

an input unit configured to input one or more input image signals, which include a first image signal having a first image quality;

an instruction unit configured to receive a comparison instruction to display the first image signal in the first image quality and in a second image quality;

a determination unit configured to determine whether both of the first image signal and a fourth image signal having the second image quality are included in the one or more input image signals;

a generation unit configured to generate the fourth image signal from the first image signal in the case of the determination unit not determining that both of the image signals are included; and a display unit configured to display the first image signal and the fourth image signal, wherein one of the first image quality and the second image quality is an image quality of an image signal on which predetermined image processing is performed, and the other of the first image quality and the second image quality is an image quality of an image signal on which the predetermined image process is not performed.

A third aspect of the present invention is a control method for a display apparatus, comprising:

an input step of inputting a first image signal having a first image quality;

an instruction step of receiving a comparison instruction to display the first image signal in the first image quality and in a second image quality;

a generation step of generating an image signal; and a display step of displaying the first image signal and the image signal generated in the generation step, wherein in the generation step, in the case of the display apparatus storing correspondence to generate a second image signal having the second image quality from the first image signal, the second image signal is generated from the first image signal in accordance with the correspondence, and in the case of the display apparatus not storing the correspondence to generate the second image signal from the first image signal, a third image signal is generated in the generation step by performing a predetermined luminance conversion on the first image signal.

A fourth aspect of the present invention is a control method for a display apparatus, comprising:

an input step of inputting one or more input image signals, which include a first image signal having a first image quality;

an instruction step of receiving a comparison instruction to display the first image signal in the first image quality and in a second image quality;

a determination step of determining whether both of the first image signal and a fourth image signal having the second image quality are included in the one or more input image signals;

a generation step of generating the fourth image signal from the first image signal in the case where it is not determined that both of the image signals are included in the determination step; and a display step of displaying the first image signal and the fourth image signal, wherein one of the first image quality and the second image quality is an image quality of an image signal on which predetermined image processing is performed, and the other of the first image quality and the second image quality is an image quality of an image signal on which the predetermined image processing is not performed.

Further features of the present invention will become apparent from the following description of exemplary embodiments with reference to the attached drawings.

BRIEF DESCRIPTION OF THE DRAWINGS

FIG. 3 is an example of a display type setting according to Embodiment 1;

FIG. 4 is a table indicating correspondence between an HDR signal and an SDR signal according to Embodiment 1;

FIG. 6 is a flow chart depicting processing of HDR/SDR comparison according to Embodiment 1; and FIG. 7 is a flow chart depicting processing of LUT comparison according to Embodiment 1.

DESCRIPTION OF THE EMBODIMENTS

Preferred embodiments of the present invention will be described in detail with reference to the accompanying drawings. The technical scope of the present invention is determined by the Claims, and is not limited by the following embodiments. Further, all combinations of the features described in the embodiments are not necessarily essential requirements of the present invention.

Embodiment 1

A display apparatus according to Embodiment 1 of the present invention will be described with reference to the drawings. In the comparison display of a plurality of image qualities, the display apparatus of Embodiment 1 generates image signals used for the comparison from the input image signals, even if the image signals having an image quality used for the comparison are not being inputted to the display apparatus, whereby the comparison display of image signals having different image qualities is enabled. The differences of image qualities in the embodiments refers to the differences depending on "whether an HDR image signal (HDR signal) is used or an SDR image signal (SDR signal) is used", "whether a lookup table (LUT) is used or not", "whether a CDL is used or not", and "whether predetermined image processing is used or not".

(Configuration of Display Apparatus)

Figure 1:
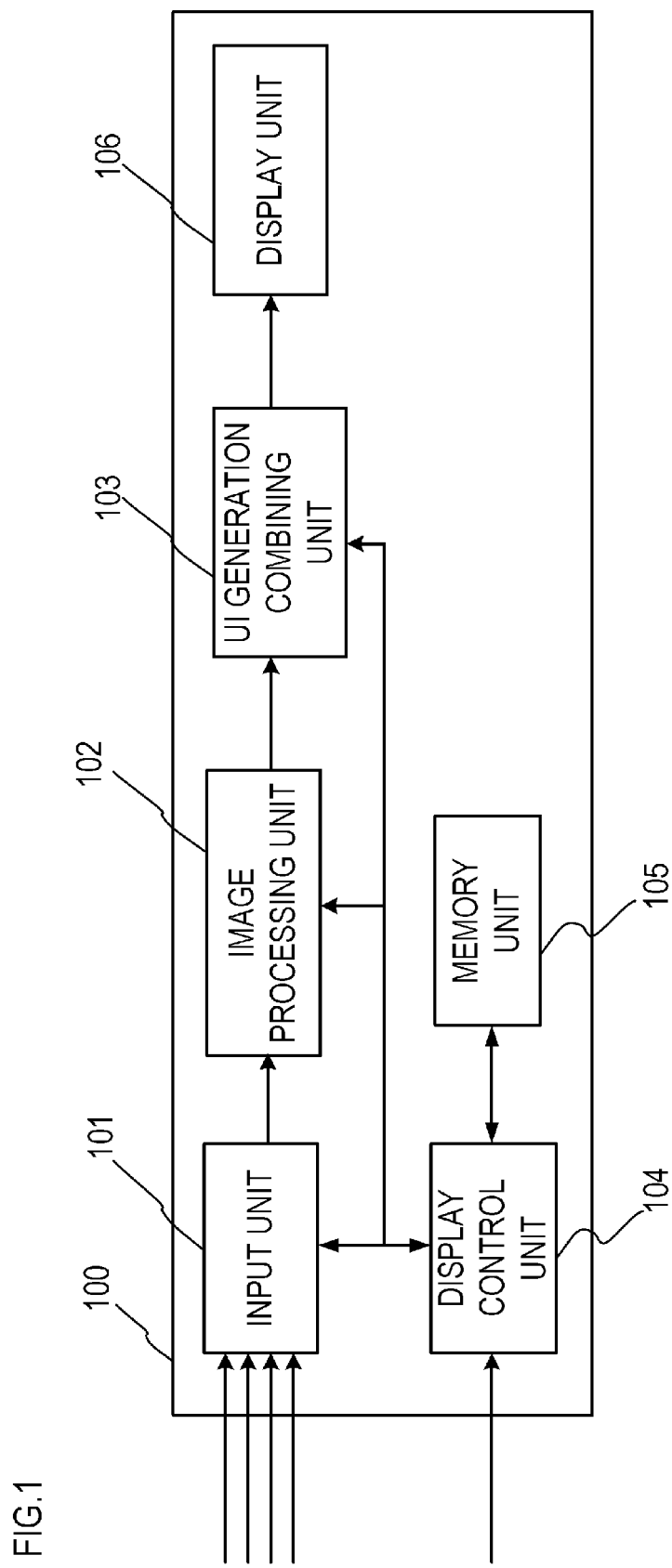
FIG. 1 is a diagram depicting a configuration of a display apparatus according to Embodiment 1.

FIG. 1 is a diagram depicting a configuration of the display apparatus (video display apparatus). The display apparatus 100 includes an input unit 101, an image processing unit 102, a UI generation combining unit 103, a display control unit 104, a memory unit 105, and a display unit 106.

To the input unit 101, one or more input image signals (video signals) are inputted via a serial digital interface (SDI), a high definition multimedia interface (HDMI™) or the like. The input unit 101 selects one or more signals to be displayed, out of the one or more input image signals that are inputted, in accordance with the instruction of the later mentioned display control unit 104, and outputs the signals to the image processing unit 102.

The input unit 101 also has a function to acquire meta-information of an input image signal that is transferred via SDI or HDMI™. For example, the input unit 101 can acquire information included in the InfoFrame information specified via HDMI™, such as information indicating that the color gamut is BT. 709 or BT. 2020, or information indicating that the standard related to dynamic range is PQ, HLG or SDR. The meta-information of the input image signal includes information on whether gradation conversion, using CDL or an LUT, has been performed on the input image signal.

Some imaging apparatuses, such as a camera, transmit such information as color gamut and gamma of the dynamic range using an ancillary (ANC) data information region of a blanking unit, which is specified via SDI. Here information that conforms to BT. 2020 or BT. 709 is transmitted as information on the color gamut, and information that indicates the gamma characteristic of HLG, PQ, Gamma 2.2, Gamma 2.4 or an LOG data output unique to the camera is transmitted. By acquiring and analyzing this ANC information region, the input unit 101 can acquire information on the input image signals. The input unit 101 outputs the information on all the input image signals to the display control unit 104 as the signal information.

The image processing unit 102 performs the image quality processing in accordance with the color gamut and the image quality processing in accordance with the dynamic range and gamma, for the input image signal inputted from the input unit 101, based on the instruction by the display control unit 104. The image processing unit 102 can also perform such image quality processing as conversion of the gradation value of the image signal using CDL or LUT, and luminance adjustment of the image signal. The image processing unit 102 outputs the input image signal generated after the image processing to the UI generation combining unit 103.

The image processing unit 102 can also divide the input image signal into a plurality of regions horizontally or vertically within the signal, and perform different image processing for each of the plurality of divided regions respectively. Further, in the case where a plurality of input image signals exist, the image processing unit 102 can perform different image processing on each of the plurality of input image signals respectively. Depending on the input image signal, the image processing unit 102 can perform processing to generate an HDR signal in accordance with such standards as HLG and PQ, or processing to generate an SDR signal in accordance with such a standard as Gamma 2.2. It is also possible to perform image quality processing to convert an input image signal, in accordance with such a standard as LOG which is unique to the camera, into an HDR signal or SDR signal. In this way, the image processing unit 102, which can generate image signals, may be regarded as a generation unit.

The UI generation combining unit 103 combines a plurality of image signals inputted from the image processing unit 102, and outputs the combined signal to the display unit 106. The instructions to generate the combined signal, such as arrangement of the plurality of image, are inputted from the display control unit 104. The UI generation combining unit 103 may draw or generate a screen, such as a menu, and combine this screen with the plurality of image signals as the user interface (UI).

Figure 2:
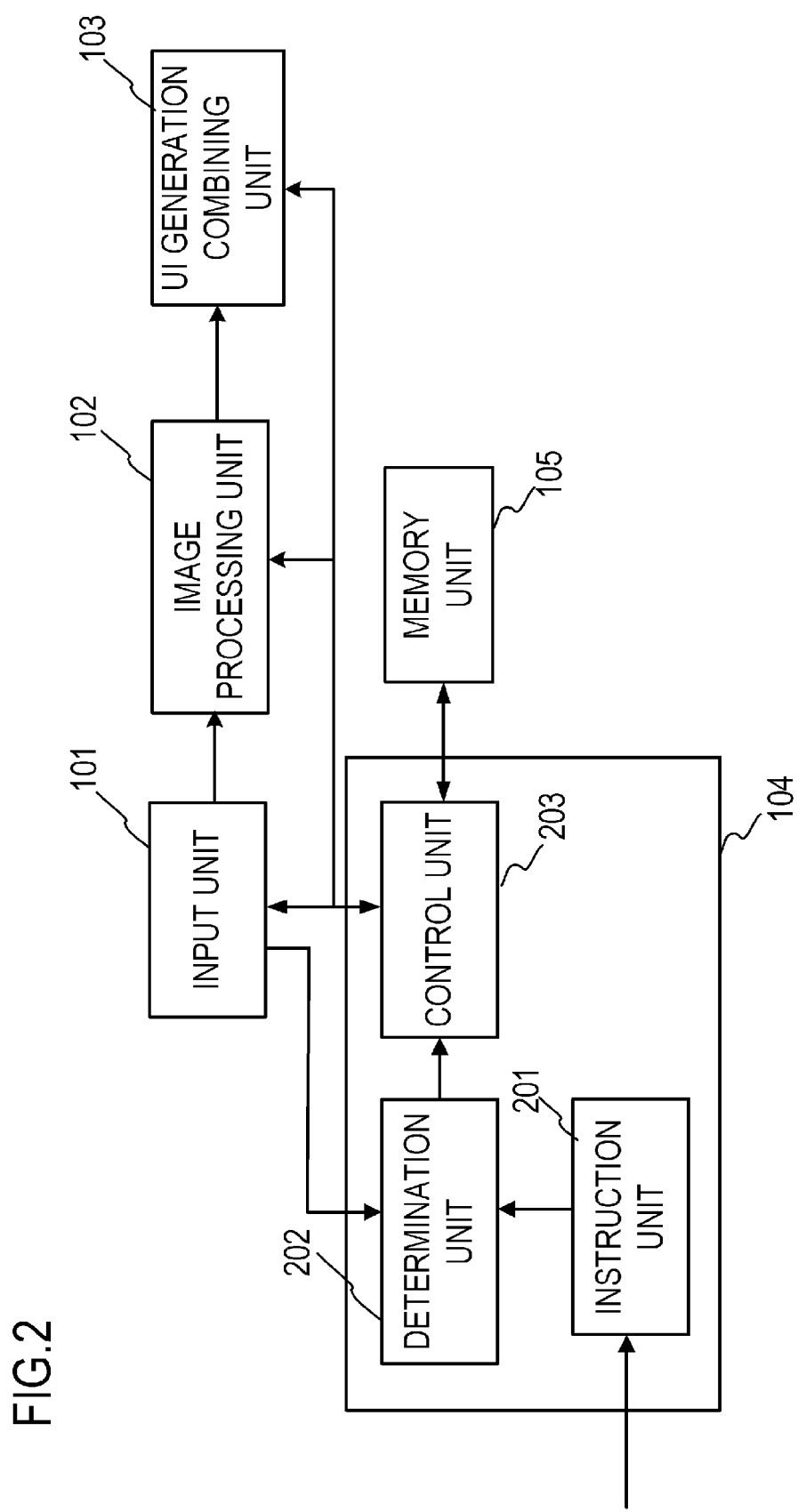
FIG. 2 is a diagram depicting a configuration of a display control unit according to Embodiment 1.

The display control unit 104 is an arithmetic processing circuit which executes a program stored in the memory unit 105, so as to control each functional unit of the display apparatus 100. The display control unit 104 selects image signals used for the comparison display in accordance with the instructions from the user to perform comparison, and implements the comparison display of the image signals having different image qualities by controlling each functional unit. FIG. 2 is a diagram depicting a configuration of the display control unit 104. The display control unit 104 includes an instruction unit 201, a determination unit 202 and a control unit 203.

The instruction unit 201 receives a display type setting (comparison instruction) which the user inputted via buttons or the like. In other words, the instruction unit 201 receives an instruction to perform the comparison display of an input image signal by displaying the input image signal at a predetermined image quality and at an image quality other than the predetermined image quality. FIG. 3 is an example of the display type setting (comparison instruction) of the comparison display on the display apparatus 100 according to this embodiment. In this embodiment, "HDR/SDR comparison", "LUT comparison", "image processing comparison", or "OFF (comparison display is not performed)" can be set as a set value of the display type setting. "HDR/SDR comparison" indicates a comparison performed by displaying the HDR signal and SDR signal side by side. Here the gamma and color gamut of the HDR signal and SDR signal are arbitrary, as long as it is within the dynamic range. "LUT comparison" indicates a comparison performed by displaying an image signal generated using LUT and an image signal generated without using LUT, displayed side by side. "Image processing comparison" indicates a comparison performed by displaying an image signal on which predetermined image processing was performed and an image signal on which the predetermined image processing was not performed. The user of LUT is also an example of image processing. Therefore, the generation of an SDR signal from an HDR signal or the generation of an HDR signal from an SDR signal using LUT can also be regarded as an example of image processing. For example, in the case of generating an SDR signal from an HDR signal by image processing, the HDR signal is the image signal for which the image processing was not performed, and the SDR signal is the image signal for which the image processing was performed. The display type setting may include "CDL comparison", which sets a comparison display between an image signal generated without using CDL and an image signal generated using CDL. The instruction unit 201 outputs the instructed display type setting to the determination unit 202.

The display type setting is not limited to the input from the user. For example, the instruction unit 201 may acquire signal information from the input unit 101 and set the display type setting (comparison instruction), such that "HDR/SDR comparison" is set if an HDR signal was inputted, or "LUT comparison" is set if an image signal generated with LUT was inputted.

When the display type setting is inputted from the instruction unit 201, the determination unit 202 acquires the signal information inputted from the input unit 101. In accordance with the acquired signal information and display type setting, the determination unit 202 determines whether a signal corresponding to the display type setting is included in one or more input image signals. The type of the input image signal that was inputted can be determined by the gamma information included in the signal information, and, for example, the HDR signal was inputted if the gamma is PQ, and the SDR signal was inputted if the gamma is Gamma 2.2. If the display type setting is "HDR/SDR comparison display", for example, the determination unit 202 determines whether both the HDR signal and the SDR signal are included in one or more input image signals. In other words, concerning the two signals required for the comparison display, the determination unit 202 determines whether "both are included" or "only one is included". In this embodiment, it is assumed that at least one of the two signals required for the comparison display was inputted as the input image signal, but it may be assumed that neither signal was inputted. In this case, the display apparatus 100 does not perform the comparison display, for example.

The determination unit 202 selects one or more input image signals used for the comparison display based on the determination result and the display type setting. For example, if the display type setting is "HDR/SDR comparison display" and the determination result is "both are included", then the control unit 203 selects that the two input image signals determined as "included" are used for the comparison display. If the display type setting is "HDR/SDR comparison display" and the determination result is "only one is included", then the determination unit 202 selects that this one input image signal, determined as "included", is used for the comparison display. The determination unit 202 outputs the information which indicates the selected signals used for the comparison display, to the control unit 203.

The control unit 203 determines the image processing that is performed for the input image signals selected by the determination unit 202. Then the control unit 203 outputs one or more input image signals to the input unit 101, and instructs the image processing unit 102 to perform at least one image quality processing. The instruction executed by the control unit 203 differs depending on the display type setting, hence the instruction which the control unit 203 executes for each functional unit will be described later.

The memory unit 105 is a non-volatile storage medium, (e.g. a hard disk) to store programs and parameters which the display control unit 104 uses to control each functional unit, and a volatile storage medium (e.g. a semiconductor memory). The memory unit 105 stores a plurality of correspondences (e.g. LUT, functions) to generate an SDR signal from an HDR signal, or to generate an HDR signal from an SDR signal. In concrete terms, the memory unit 105 stores the correspondence that can be used for converting the HDR signal into the SDR signal or vice versa, as indicated in FIG. 4. The correspondence may be one which allows one-way conversion from one to the other, instead of two-way conversion. In the case of FIG. 4, the HDR signal, of which color gamut is BT. 2020 and gamma characteristic is PQ, corresponds to the SDR signal, of which color gamut is BT. 709 and gamma characteristic is Gamma 2.4. In other words, the SDR signal, of which color gamut is BT. 709 and gamma characteristic is Gamma 2.4, can be generated from the HDR signal, of which color gamut is BT. 2020 and gamma characteristic is PQ using this correspondence and vice versa. The plurality of correspondences are assumed to be created in advance based on the relationship between the color gamut and gamma characteristic of the HDR signal and the color gamut and gamma characteristic of the SDR signal. In this embodiment, only a part of the correspondences are stored due to limitations in storage capacity of the memory unit 105, and manual operation that is required to create the correspondences. For example, in the case of FIG. 4, the memory unit 105 does not store the SDR signal which corresponds to the HDR signal of which color gamut is A and gamma characteristic is Gamma C. The correspondence is not limited to the correspondence between the color gamut and gamma characteristic, but may be a correspondence that considers resolution, for example. The memory unit 105 also stores such information as LUT, CDL and image processing which are performed on the image signals.

The display unit 106 displays an image on the screen based on the composite signal outputted from the UI generation combining unit 103. For example, the display unit 106 may be a liquid crystal display which includes a liquid crystal panel as a backlight, or may be a light emission type organic EL display. The display unit 106 may be a projector which displays an image by projecting the image on a projection object, such as a screen.

Figure 5A:
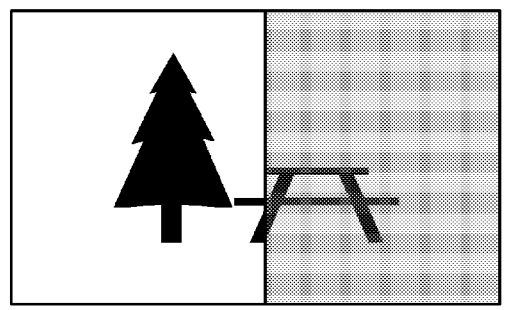
FIG. 5A to FIG. 5D are illustrations depicting an example of a comparison display according to Embodiment 1.

FIG. 5A to FIG. 5D illustrate examples of the comparison display displayed by the display unit 106 according to this embodiment. FIG. 5A is a case where "HDR/SDR comparison" is inputted as the display type setting, and an image signal of HDR is displayed on the left screen of the display apparatus 100 and an image signal of SDR is displayed on the right screen thereof. Here the image quality of the left half of one image signal is HDR, and the image quality of the right half thereof is SDR. In this embodiment, the screen is divided horizontally since the screen of the display unit 106 is sidelong, but the screen may be divided vertically or only a predetermined region of the screen may be used for HDR and the remainder for SDR. Further, the setting may be "comparison of an image signal of which dynamic range is $10^4$ and an image signal of which dynamic range is $10^2$" instead of "HDR/SDR comparison".

Figure 5B:
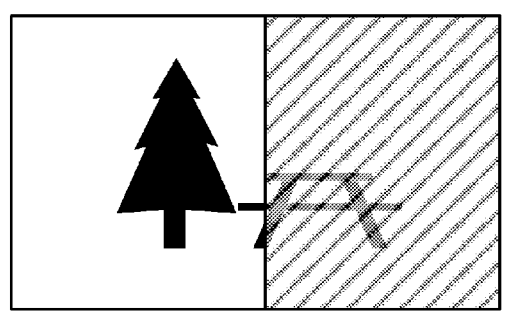

FIG. 5B is a case where "LUT comparison" is inputted as the display type setting, and an image signal, generated using LUT, is displayed on the left screen of the display apparatus 100, and an image signal, generated without using LUT, is displayed on the right screen thereof. Here LUT is used for the left half of one image signal, and LUT is not used for the right half thereof. Just like the comparison display of LUT depicted here, a case of using and not using CDL may be compared.

Figure 5C:
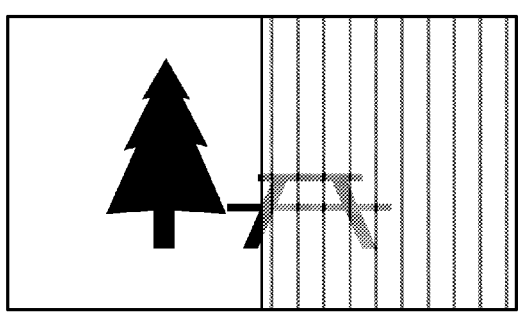

FIG. 5C is a case where "image processing comparison" is inputted as the display type setting, and an image signal generated using the image processing is displayed on the left screen of the display apparatus 100, and an image signal generated without using the image processing is displayed on the right screen thereof. Here the image processing is used for the left half of one image signal, and the image processing is not used for the right half thereof.

Figure 5D:
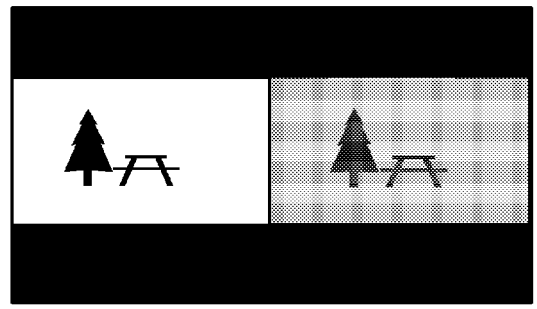

FIG. 5D is a case where, just like FIG. 5A, "HDR/SDR comparison" was inputted as the display type setting, and an image signal of HDR is displayed on the left screen of the display apparatus 100, and an image signal of SDR is displayed on the right screen thereof. However, unlike FIG. 5A, the image signal of HDR and the image signal of SDR, generated from the same image signal, are reduced in size respectively so that the image signals can be displayed side by side without overlapping. In this embodiment, the image signals are disposed horizontally since the screen of the display unit 106 is sidelong, but the image signals may be disposed vertically. In the comparison display in FIG. 5D, the difference of image quality of the entire image signal can be recognized compared with the comparison display in FIG. 5A.

(Processing Flow Chart of HDR/SDR Comparison)

The processing of the HDR/SDR comparison of the display apparatus 100 according to this embodiment will be described next with reference to the flow chart in FIG. 6. In this flow chart, the processing starts when the user inputs "HDR/SDR comparison" in the display type setting in FIG. 3 to the instruction unit 201 using a button or the like, for example. In this flow chart, it is assumed that one of three patterns of image signals: "only HDR signal", "only SDR signal" and "both HDR signal and SDR" is/are inputted to the input unit 101, to simplify description. The signal information on the input image signal is information indicating an arbitrary color gamut and gamma characteristic.

(S1001)

The determination unit 202 acquires signal information inputted from the input unit 101, and determines whether two input image signals in accordance with the display type setting acquired from the instruction unit 201 are inputted. The processing step advances to S1002 if signals in accordance with the display type setting are inputted, or to S1004 if not. In concrete terms, the determination unit 202 determines whether both the HDR signal and SDR signal are inputted since "HDR/SDR comparison" is set as the display type setting. In other words, the processing step advances to S1002 if both the HDR signal and SDR signal are inputted, or to S1004 if only one of the HDR signal and SDR signal is inputted.

(S1002)

If it is determined that both of the input image signals are inputted in S1001, the control unit 203 instructs the input unit 101 to output the two input image signals (HDR signal and SDR signal) to the image processing unit 102. The input unit 101 outputs the instructed two input image signals to the image processing unit 102.

(S1003)

The control unit 203 instructs the image processing unit 102 to perform image quality control in accordance with the signal information of the two input image signals respectively. In concrete terms, the image processing unit 102 adjusts the luminance of the input image signals to have image quality settings appropriate for the HDR signal and SDR signal respectively. For example, in the case of the HDR image, the image processing unit 102 performs the luminance adjustment corresponding to HLG or PQ to the input image signal, and in the case of the SDR image, the image processing unit 102 performs the luminance adjustment corresponding to Gamma 2.2 or the like to the input image signal. The image processing unit 102 outputs the adjusted two input image signals to the UI generation combining unit 103, and the UI generation combining unit 103 combines the two image signals to be disposed side by side, and outputs this composite signal to the display unit 106. The display unit 106 displays the composite signal as illustrated in FIG. 5D, for example.

(S1004)

If it is not determined that both of the input image signals are inputted in S1001, the control unit 203 determines whether the image signal required for the comparison display can be generated based on the signal information and the display type setting. In other words, in the case where only one of the HDR signal and the SDR signal is inputted to the input unit 101, the control unit 203 determines whether the other image signal can be generated from this input image signal.

In concrete terms, if the input image signal is the HDR signal, the control unit 203 determines whether the SDR signal can be generated from the input image signal using the correspondence stored in the memory unit 105. If the input image signal is the SDR signal, the control unit 203 determines whether the HDR signal can be generated from the input image signal using the correspondence. In other words, it is determined by the control unit 203 depending on whether the memory unit 105 stores a correspondence including the input image signal. The processing steps advance to S1005 if this generation is possible, or to S1006 if not.

(S1005)

The control unit 203 instructs the input unit 101 to output the input image signal to the image processing unit 102, and the input unit 101 outputs the input image signal to the image processing unit 102. Further, the control unit 203 instructs the image processing unit 102 to generate a corresponding image signal from the input image signal. At this time, the control unit 203 also outputs information required for generating the image signal out of the correspondence stored in the memory unit 105 to the image processing unit 102. Based on the correspondence, the image processing unit 102 generates an image signal (generation image) corresponding to the input image signal. The input image signal and the generation signal are luminance-adjusted in the same way as S1005, and are outputted to the UI generation combining unit 103. Further, the display unit 106 displays a composite signal generated by the UI generation combining unit 103 combining the two image signals.

The image processing unit 102 may generate a generation signal from a partial region of the input image signal. In other words, if the input image signal is an HDR signal, for example, the image processing unit 102 may generate an SDR signal from a partial region of the image signal. When such a generation signal is generated, an image signal, in which the dynamic range is different between the left and right regions, for example, is displayed as illustrated in FIG. 5A, using a region other than the above mentioned partial region of the input image signal and the generation signal.

(S1006)

The control unit 203 instructs the image processing unit 102 to perform simple (pseudo-) image processing. In concrete terms, if the display type setting is "HDR/SDR comparison" and an HDR signal is inputted, the image processing unit 102 performs image quality processing on the HDR signal in accordance with HDR, just like S1003. Then the image processing unit 102 generates a pseudo-SDR signal (pseudo-image quality signal) by performing processing to convert the luminance of a region of the HDR signal exceeding 100 cd/m$^2$ into 100 cd/m$^2$. This is because the upper limit luminance of the HDR signal is higher than the upper limit luminance of the SDR signal. The generated pseudo-image quality signal and the HDR signal are combined by the UI generation combining unit 103, and are displayed by the display unit 106. Here the upper limit value of the luminance range of the SDR signal is 100 cd/m$^2$, but the upper limit value is not limited to this, and may be 90 cd/m$^2$, for example. In the case when the HDR signal has been inputted, the luminance of the HDR signal is converted by multiplying a predetermined luminance reduction rate so as to be within the dynamic range of the SDR signal, and an image signal having this converted luminance may be displayed as the pseudo-image quality signal. In the case where the SDR signal is inputted as the input image signal, the image processing unit 102 may generate a pseudo-image quality signal by multiplying the luminance of the SDR signal by the ratio of the dynamic ranges between the HDR signal and the SDR signal, for example. Just like S1005 mentioned above, the image processing unit 102 may generate a pseudo-image quality signal from a partial region of the input image signal. In this way, even in the case of an image signal which cannot be generated using the correspondence, a pseudo-image quality signal, close to the image quality used for the comparison display, is generated and displayed, hence the user can recognize the difference of the simulated image qualities of the two image signals displayed for comparison.

In the above-mentioned flow chart, there are three patterns of input image signals: "only HDR signal" is inputted, "only SDR signal is inputted, and "both HDR signal and SDR signal" are inputted. However, a plurality of SDR signals, a plurality of HDR signals, or a plurality of SDR signals and a plurality of HDR signals may be inputted to the input unit 101. In this case, it is preferable to prioritize signal information corresponding to each image signal used for the comparison display for each HDR signal and SDR signal respectively. Then the determination unit 202 can select one or two image signals used for the comparison display out of the plurality of input image signals, in accordance with the signal information and the priority ranking. It is preferable that signal information corresponding to (or included in) the correspondence stored by the memory unit 105 is set to a higher priority ranking than the other signal information.

Instead of a comparison display of the two types of signals of the HDR signal and the SDR signal mentioned above, three or more types of image signals may be set in the display type setting for comparison display. For example, three image signals of an HDR signal of which gamma characteristic is HLG, an HDR signal of which gamma characteristic is PQ, and an SDR signal of which gamma characteristic is arbitrary may be set for image quality comparison display. In the case of this display type setting as well, the determination unit 202 determines whether image signals corresponding to these three image qualities are inputted. If it is determined that the three image signals are inputted, luminance adjustment and the like are performed on the three image signals, and the result is displayed. If these three image signals are not inputted, on the other hand, whether an image signal having another image quality can be generated form the input image signal may be determined, and an image signal having another image quality or a pseudo-image signal having another image quality may be generated.

(Processing Flow Chart in LUT Comparison)

The processing of the LUT comparison display of the display apparatus 100 according to this embodiment will be described next with reference to the flow chart in FIG. 7. In this flow chart, processing starts when the user inputs "LUT comparison" in the display type setting in FIG. 3 to the instruction unit 201 using a button or the like, for example. In this flow chart, it is assumed that one of three patterns: "one image signal generated using LUT", "one image signal generated without using LUT", and "two image signals which are not regarded as image signals generated using LUT" are inputted to the input unit 101, to simplify description. the signal information on the input image signal is information indicating whether LUT was used or not.

(S2001)

The input unit 101 outputs signal information on one or more input image signals to the determination unit 202. Since the display type setting is "LUT comparison", the determination unit 202 determines, based on the signal information, whether both an image signal generated using LUT and an image signal without using LUT are inputted from one or more input image signals. If it is determined that both the image signals are inputted, the processing step advances to S2002, and if it is determined that only one of the image signals is inputted, the processing step advances to S2003.

(S2002)

The control unit 203 instructs the input unit 101 to output the determined two image signals, that is, an image signal generated using LUT, and an image signal generated without using LUT, to the image processing unit 102.

(S2003)

The control unit 203 instructs the image processing unit 102 to generate an image signal having another image quality from one input image signal. In concrete terms, if LUT was not used for the input image signal, the image processing unit 102 uses LUT for the input image signal in accordance with the information on LUT stored in the memory unit 105. If LUT was used for the input image signal, the image processing unit 102 performs processing to cancel the use of LUT for the input image signal in accordance with the information on LUT stored in the memory unit 105. Thereby the display apparatus 100 can receive the image signal generated using LUT and the image signal generated without using LUT.

(S2004)

The control unit 203 instructs the image processing unit 102 to perform the image quality control on the image signal generated using LUT and the image signal generated without using LUT. This is processing in accordance with the color gamut and gamma characteristic of the dynamic range of each image signal as mentioned above. The two image signals generated after the image quality control are outputted to the UI generation combining unit 103. The UI generation combining unit 103 generates a composite signal of the two image signals, and outputs the composite signal to the display unit 106. The display unit 106 displays the inputted composite signal.

In this way, if the display type setting is "LUT comparison", the memory unit 105 stores the information on LUT, hence the flow chart in which an image signal having a pseudo-image quality is not generated is used, unlike the case of "HDR/SDR comparison". If the memory unit 105 does not store LUT, processing to use a pseudo-LUT on the image signal using a function corresponding to LUT may be performed. If this processing is used, comparison display can be implemented according to steps similar to the flow chart of "HDR/SDR comparison". The present embodiment is not limited to "LUT comparison", but may also be implemented as "CDL comparison" and "image processing comparison" by regarding the "LUT" in S2001 to S2004 of this flow chart as "CDL" or "image processing".

(Effects)

As described above, comparison display of image signals having different image qualities can be implemented by selecting or generating image signals which the display apparatus compares, in accordance with the display type setting and the signal information on the input image signals. Therefore, the user need not precisely set image signals for comparison display. As a result, the comparison display, in accordance with the image quality desired by the user, can be easily implemented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-047776, filed on Mar. 15, 2018, which is hereby incorporated by reference herein in its entirety.

What is claimed is:

1. A display apparatus, comprising:
   a memory that stores correspondence to convert an image quality of an image signal; and
   at least one processor that operates as:
   an input unit configured to input a first image signal having a first image quality;

an instruction unit configured to receive an instruction to display a plurality of image signals side by side on a display;
a generation unit configured to generate an image signal; and
a control unit configured to display the first image signal and the image signal generated by the generation unit on the display, wherein in the case of the memory storing correspondence to generate a second image signal having a second image quality different from the first image quality from the first image signal, 1) the generation unit generates the second image signal from the first image signal in accordance with the correspondence, and 2) the control unit displays the first image signal and the second image signal side by side on the display in response to the instruction, and in the case of the memory not storing the correspondence to generate the second image signal from the first image signal, 3) the generation unit generates a third image signal having the second image quality by performing a predetermined luminance conversion on the first image signal, and 4) the control unit displays the first image signal and the third image signal side by side on the display in response to the instruction.

2. The display apparatus according to claim 1, wherein the dynamic range is different between the first image quality and the second image quality.

3. The display apparatus according to claim 2,
wherein an upper limit luminance with the first image quality is higher than an upper limit luminance with the second image quality, and
the predetermined luminance conversion is processing to convert a luminance of a region of the first image signal that is higher than the upper limit luminance with the second image quality into the upper limit luminance with the second image quality.

4. The display apparatus according to claim 1, wherein the correspondence is a correspondence of a gamma and a color gamut of an image signal.

5. The display apparatus according to claim 1,
wherein the generation unit is further configured to generate the second image signal or the third image signal from a partial region of the first image signal, and
the control unit is further configured to display a region of the first image signal other than the partial region, and any one of the second image signal and the third image signal generated by the generation unit side by side on the display.

6. The display apparatus according to claim 1, wherein at least one processor further operates as:
a determination unit configured to determine whether both the first image signal and a fourth image signal having the second image quality are included in one or more input image signals,
wherein the input unit is further configured to input one or more image signals including the first image signal, and
in the case of the determination unit determining that both of the image signals are included,
the generation unit is further configured not to generate an image signal, and
the control unit is further configured to display the first image signal and the fourth image signal on the display.

7. The display apparatus according to claim 1, wherein the first image quality is an image quality of high dynamic range (HDR), and the second image quality is an image quality of standard dynamic range (SDR).

8. A display apparatus, comprising:
at least one processor that operates as:
an input unit configured to input one or more input image signals, which include a first image signal having a first image quality;
an instruction unit configured to receive an instruction to display a plurality of image signals side by side on a display;
a determination unit configured to determine whether both of the first image signal and a fourth image signal having a second image quality different from the first image quality are included in the one or more input image signals;
a generation unit configured to generate the fourth image signal from the first image signal; and
a control unit configured to display the first image signal and the fourth image signal on the display,
wherein one of the first image quality and the second image quality is an image quality of an image signal on which predetermined image processing is performed,
the other of the first image quality and the second image quality is an image quality of an image signal on which the predetermined image processing is not performed,
in a case where the determination unit determines that both of the first image signal and the fourth image signal are included, the control unit displays the first image signal and the fourth image signal which is input from the input unit side by side on the display in response to the instruction, and
in a case where the determination unit does not determine that both of the first image signal and the fourth image signal are included, the control unit displays the first image signal and the fourth image signal, which is generated from the first image signal by the generation unit, side by side on the display in response to the instruction.

9. The display apparatus according to claim 8, wherein the predetermined image processing is processing using a lookup table.

10. The display apparatus according to claim 8, wherein the predetermined image processing is processing using a color decision list.

11. A control method for a display apparatus, comprising:
an input step of inputting a first image signal having a first image quality;
an instruction step of receiving an instruction to display a plurality of image signals side by side on a display;
a generation step of generating an image signal; and
a display step of displaying on the display the first image signal and the image signal generated in the generation step,
wherein in the case of the display apparatus storing correspondence to generate a second image signal having a second image quality different from the first image quality from the first image signal, 1) in the generation step, the second image signal is generated from the first image signal in accordance with the correspondence, and 2) in the display step, the first image signal and the second image signal are displayed side by side on the display in response to the instruction, and in the case of the display apparatus not storing the correspondence to generate the second image signal from the first image signal, 3) in the generation step, a third image signal having the second image quality is generated by performing a predetermined luminance conversion on the first image signal, and 4) in the display step, the first image signal and the third image signal are displayed side by side on the display in response to the instruction.

12. A non-transitory computer readable medium storing a program for causing a computer to execute the steps of the control method according to claim 11.

13. A control method for a display apparatus, comprising:
an input step of inputting one or more input image signals, which include a first image signal having a first image quality;
an instruction step of receiving an instruction to display a plurality of image signals side by side on a display;
a determination step of determining whether both of the first image signal and a fourth image signal having a second image quality different from the first image quality are included in the one or more input image signals;
a generation step of generating the fourth image signal from the first image signal; and
a display step of displaying the first image signal and the fourth image signal on the display,
wherein one of the first image quality and the second image quality is an image quality of an image signal on which predetermined image processing is performed,
the other of the first image quality and the second image quality is an image quality of an image signal on which the predetermined image processing is not performed,
in a case where it is determined in the determination step that both of the first image signal and the fourth image signal are included, in the display step, displaying the first image signal and the fourth image signal which is input in the input step side by side on the display in response to the instruction, and
in a case where it is not determined in the determination step that both of the first image signal and the fourth image signal are included, in the display step, displaying the first image signal and the fourth image signal, which is generated from the first image signal in the generation step, side by side on the display in response to the instruction.

14. A non-transitory computer readable medium storing a program for causing a computer to execute the steps of the control method according to claim 13.

* * * * *